United States Patent Office 2,746,195
Patented May 22, 1956

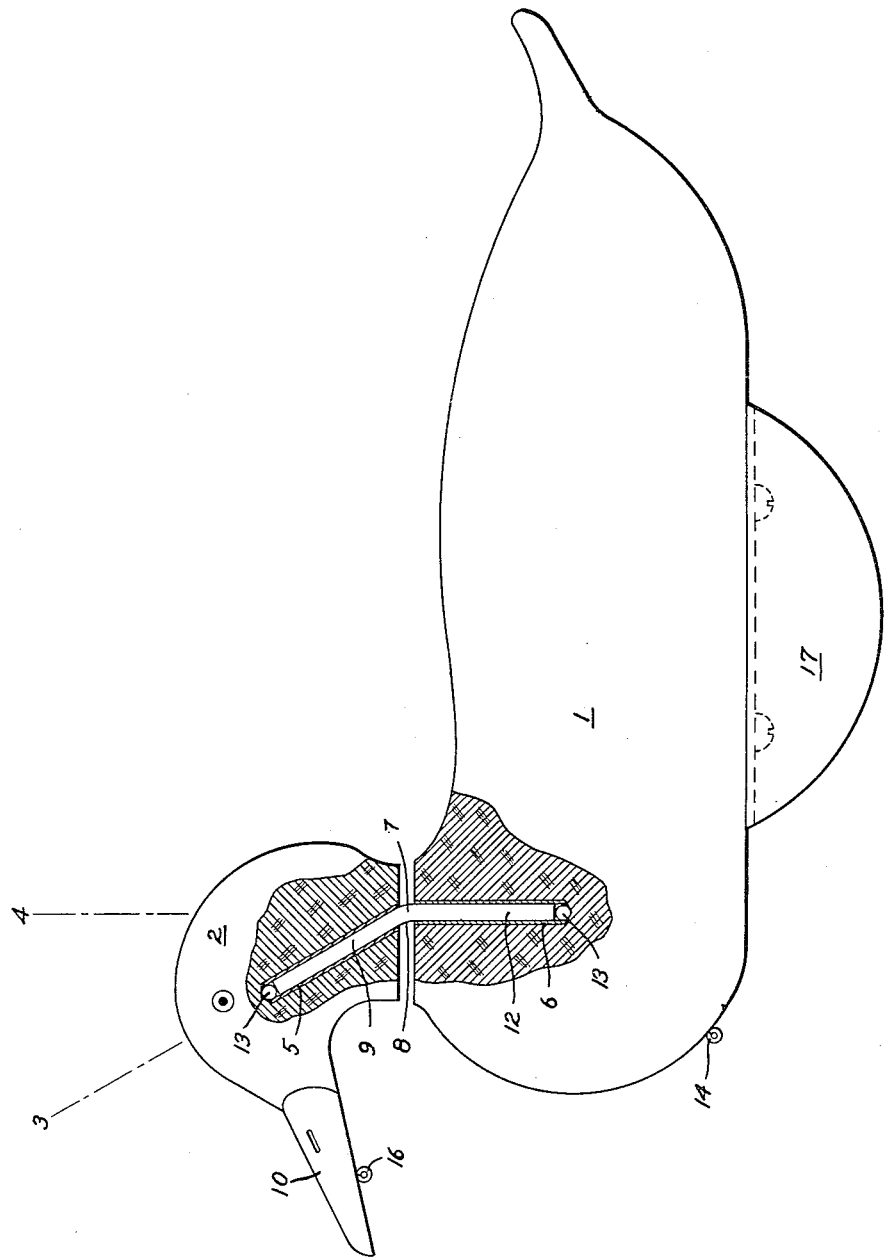

2,746,195
DECOY

Charles S. Renwick, Jr., Richmond, Calif.

Application October 15, 1951, Serial No. 251,320

4 Claims. (Cl. 43—3)

My invention relates to decoys for game birds.

One of the objects of my invention is the provision in a decoy of an improved but inexpensive pivotal mounting by which the head is movably mounted on the body.

Another object is the provision of means for mounting the head of a decoy on the body, so that movement of the body on the surface of the water causes the head to move in a life-like manner.

The invention possesses other objects, some of which, with the foregoing, will be brought out in the following description of the invention. I do not limit myself to the showing made by the said description and the drawings, since I may adopt variant forms of the invention within the scope of the appended claims.

In the drawings, the figure is a side elevation of a duck decoy embodying my invention as it would appear when floating. Portions of the head and body are broken away to show the pivotal connection and bearings between them.

Broadly, the decoy of my invention resembles a duck and is formed of a buoyant material such as cork or wood. The head is formed apart from the body and spaced therefrom when assembled. The connecting means between the head and body includes a bearing sleeve or bushing embedded in the head and another embedded in the body. Each sleeve is of a size to rotatably receive one end of a bearing rod extending between the sleeves, the journaled ends of the rod lying at an angle to each other. A ball adjacent the embedded end of each sleeve provides an adequate thrust bearing for the adjacent end of the rod. Means are also provided for anchoring the decoy.

In terms of greater detail, my decoy comprises a body 1, preferably shaped and painted to resemble a duck or other game bird, and formed from a buoyant material such as cork or wood. A head 2, which is ordinarily formed as a part of the body, in my decoy is made separately and is pivotally mounted on the body for movement relative thereto about two separate but intersecting axes 3 and 4, the axis 3 being fixed with relation to the head and the axis 4 being fixed with relation to the body. The head 2 includes a beak portion 10 which extends outwardly from the body 1 when in normal floating position.

Embedded in the head and body respectively, are bearing sleeves 5 and 6. The bearing sleeves are positioned in the head and body so that the axes 3 and 4 respectively, are coincident with the longitudinal axes of the sleeves 5 and 6 respectively. The sleeves are preferably formed of a moisture impervious material such as aluminum or one of the plastics. For economy of manufacture the tubes may be conveniently cut from a standard tubing.

The connecting means between head and body is a bearing rod 7 bent at its mid-point 8. The journaled straight end portions 9 and 12 of the rod are journaled in the sleeves 5 and 6 respectively. The bearing rod is preferably cut from heavy gauge wire and the mid-point bend leaves the two sections lying at about 150° to each other, although this value is subject to some increase or decrease. When the head is mounted on the body, the bend in the rod lies between them as shown, and the journaled ends of the rod forms an easy fit in the sleeves.

Within each of the sleeves is a thrust bearing formed by a ball 13. The balls, which are preferably coppered steel or glass, are seated at the embedded ends of the sleeves and held therein by cement or a bit of tar. The ends of the rod are cut square across and seat on the balls in point bearings so that movement of the head about either axis is with only slight resistance. The balls 13 in addition to their function as thrust bearings serve to space the head 2 and body 1 in such a manner that the angle 8 of rod 7 is positioned therebetween.

To provide means to which an anchor may be attached, a screw eye 14 is threaded into the body at about the water line. If desired, a second screw eye 16 may be placed in the underside of the beak 10. This eye is particularly useful for anchoring the decoy when the water is rough or choppy, as anchoring from this point tends to reduce the overabundance of movement of the head in choppy water. A keel 17 is fastened to the bottom of the body to stabilize the floating decoy.

It will be seen from the drawing that the body sleeve 6 is placed so that its axis 4 will be generally vertical when the body of the decoy is floating on water. The head sleeve on the axis 3 is placed about as shown, in which position the center of gravity of the head is slightly forward of the axis 3 and on a lower level than the upper ball 13. This arrangement tends to return the head to the normal bill-forward position shown after any swinging movement about axis 3. Since any movement of the water will cause the buoyant body to rock or pitch, there is a tendency for the head to swing from side to side about the axis 4, at the same time swinging about the axis 3, so that an exceedingly life-like movement of the head relative to the rocking and pitching body results.

I claim:

1. A buoyant decoy constituting a simulated game bird and comprising a separate body and head, said body being adapted to float upright in its normal floating position on the surface of water, said head being disposed above said body in said normal floating position, a bearing rod having a section journaled in said head and a section journaled in said body, the journaled sections of said rod being integrally connected and lying at an angle to each other, said section of said bearing rod journaled in said body being approximately vertically disposed in said body in said normal floating position, said section of said bearing rod journaled in said head being inclined to the vertical in said normal floating position, and means for spacing said head above said body with the juncture of said rod sections lying between said head and body, whereby any movement of the water on which said decoy is floating will cause said body to rock and pitch and said head to swing about the axis of said rod section journaled in said body and about the axis of said rod section journaled in said head.

2. A decoy as set forth in claim 1 having a sleeve embedded in the head and a sleeve embedded in the body, wherein said angularly disposed sections of said bearing rod are journaled, respectively, in said sleeves, and wherein said means for spacing said head above said body comprises a ball disposed at the inner end of each of said sleeves and abutting the respective adjacent ends of said angularly disposed sections of said bearing rod.

3. A buoyant decoy constituting a simulated game bird and comprising separate body and head portions, said body portion being adapted to float upright in its normal floating position on the surface of water, said head portion having a bill section projecting therefrom and extending outwardly of said body portion in said normal floating position, a bearing rod for movably mounting said head portion on said body portion, said bearing rod having a section journaled in approximately a vertical position in said body portion when said decoy is in said normal floating position and a section integral with and angularly disposed to said first named section of said bearing rod, said second named section of said bearing rod being journaled in an angular position in said head portion extending upwardly and toward said bill section, and means for spacing said head portion above said body portion with the juncture of said rod sections lying between said head and body portions, whereby any movement of the water on which said decoy is floating will cause said body to rock and pitch and said head to swing about the axes of both of said sections of said bearing rod.

4. A decoy as set forth in claim 3 wherein the center of gravity of said head portion is disposed forwardly of said second named section of said bearing rod.

References Cited in the file of this patent

UNITED STATES PATENTS

| | | |
|---|---|---|
| 1,188,979 | Murray | June 27, 1916 |
| 1,571,213 | Pitts | Feb. 2, 1926 |
| 1,948,624 | Lyons | Feb. 27, 1934 |
| 1,982,776 | Woerner | Dec. 4, 1934 |
| 2,162,786 | Oeding | June 20, 1939 |
| 2,413,418 | Rulison | Dec. 31, 1946 |

FOREIGN PATENTS

| | | |
|---|---|---|
| 208,992 | Germany | 1909 |